April 6, 1954

L. S. CHAMBERS 2,674,313

SIDEWALL FORMATION FLUID SAMPLER

Filed April 7, 1950

INVENTOR.
Lawrence S. Chambers
BY
HIS AGENT

April 6, 1954

L. S. CHAMBERS 2,674,313

SIDEWALL FORMATION FLUID SAMPLER

Filed April 7, 1950

INVENTOR.
Lawrence S. Chambers
BY Earle W. Wallick Jr.
HIS AGENT

April 6, 1954  L. S. CHAMBERS  2,674,313
SIDEWALL FORMATION FLUID SAMPLER
Filed April 7, 1950  4 Sheets-Sheet 3

INVENTOR.
Lawrence S. Chambers
BY
HIS AGENT

April 6, 1954

L. S. CHAMBERS 2,674,313

SIDEWALL FORMATION FLUID SAMPLER

Filed April 7, 1950

INVENTOR.
Lawrence S Chambers
BY
HIS AGENT

Patented Apr. 6, 1954

2,674,313

UNITED STATES PATENT OFFICE 2,674,313

SIDEWALL FORMATION FLUID SAMPLER

Lawrence S. Chambers, Pasadena, Calif.

Application April 7, 1950, Serial No. 154,468

14 Claims. (Cl. 166—1)

The present invention relates to fluid samplers and more particularly to new and improved apparatus for obtaining samples of liquids and gases contained in the formations traversed by bore holes.

In present practice, a sample of the fluid contained in a formation beneath the surface of the earth may be obtained by packing off a portion of a bore hole opposite the formation and thereafter withdrawing formation fluid into the packed-off portion whereby a sample may be brought to the surface for examination and study. Such samples may be obtained at any selected point in an uncased or cased bore hole.

For uncased bore holes, the existing tools are generally limited in application to the obtaining of samples from formations very near the bottom of the bore hole. Thus the sample testing must necessarily be done as the drilling proceeds, eliminating the possibility of testing formations located subsequently by electrical logging or other methods and requiring the added expense of stopping the drilling at each formation possibly containing oil or gas. Such bottom hole testers usually comprise one or more expanding packers set near the bottom of the hole or a cone packer set in a reduced hole, thereby packing off the lower portion of the hole from the drilling fluid above. The formation fluid is thereafter produced into a pipe extending from beneath the packer to the surface. Occasionally, however, full hole apparatus is employed for testing formations above the bottom of the hole. Such apparatus generally comprises a pair of longitudinally spaced packers adapted to be expanded respectively above and below the formation to be tested. A rigid support, called a tail pipe, is usually attached below the packers whereby the packers will be opposite the desired formation when the tail pipe rests on the bottom of the hole, thus preventing the downward slippage of the packers. Since this tail pipe must be very rigid, its length is limited and accordingly only formations a short distance off bottom may be tested. If it is desired to test a formation which is a considerable distance above the bottom of the bore hole, a cement plug must be set therebeneath upon which the tail pipe may rest.

A surer, but far more expensive and laborious method of testing the fluid content of a well is to set casing in the well, cement around the desired formation, perforate the casing and cement, and allow the formation to produce. However, if the formation does not produce, a considerable loss of time, money and casing has been incurred.

In any of the above methods if it is desired to obtain an indication of the formation pressure, a so-called recording pressure bomb may be placed in the testing tool opposite the formation. However, a representative sample of the formation fluid is usually not obtained since the gas will separate from the oil due to the reduction in pressure as the sample is brought to the surface.

Each of the above methods is expensive and time consuming. Drill pipe or tubing must be run in the hole for each test made. Packers frequently fail and occasionally stick in the bore hole. The formation fluid obtained is frequently mixed with drilling mud and difficult to analyze. Also, thin oil and gas sands adjacent to water sands are difficult to segregate and test separately.

It is an object of the invention, accordingly, to provide new and improved apparatus for fluid sampling in a highly effective manner.

Another object of the invention is to provide novel apparatus for obtaining a sample of the fluid contained in a formation traversed by a bore hole irrespective of the location of the formation relative to the bottom of said bore hole.

Yet another object of the invention is to provide apparatus for obtaining a sample of the liquids or gases contained in a formation and retaining said sample at substantially formation pressure, whereby it may be brought to the surface for examination and study.

A further object of the invention is to provide apparatus of the above character which may be employed to obtain fluid samples from relatively thin formations.

A still further object of the invention is to provide apparatus of the above character which relies solely on the pressure of the drilling fluid in the bore hole for maintenance against the formation during sampling.

Another object of the invention is to provide a sidewall formation fluid sampler of the above character which may be remotely operated yet which does not require power to be supplied from the surface for expansion and retraction from the wall of the bore hole.

A further object of the invention is to provide a fluid sampler in which the sample retaining chamber cannot become filled too quickly even at excessive formation pressures, thereby preventing separation of the gas from the oil and resulting in a more reliable sample.

These and other objects of the invention are attained by providing a pressure-resistant housing adapted to be lowered in a bore hole on an electrical cable which contains one or more insulated conductors for remotely controlling the operation of the fluid tester. On the side of this housing are one or more normally retracted pack-off shoes which are adapted to be forced against a selected formation by the pressure differential between the high pressure drilling fluid in the bore hole and a low pressure cylinder within the housing. One of said shoes, which becomes an effective seal against the drilling fluid when forced against a formation, contains an entry port in its face connected by a channel to a sample-retaining chamber within the housing capable of holding a sizable quantity of the liquids or gases contained in a formation. This entry port, while pressed against a formation, may be opened and the formation fluid permitted to flow into the sample-retaining chamber at a rate governed by a hydraulic cushioning device contained therein. After a selected interval of time, the channel may be closed, and the shoes retracted by reducing the pressure forcing said pack-off shoes against the formation. The entire housing may be then withdrawn from the bore hole, and the chamber removed at the surface where the fluid content and pressure in the sample-retaining chamber may be measured and analyzed.

Additional objects and advantages of the invention will become apparent from the following detailed description of a representative embodiment thereof, taken in conjunction with the accompanying drawings, in which.

Figures 1A, 1B:
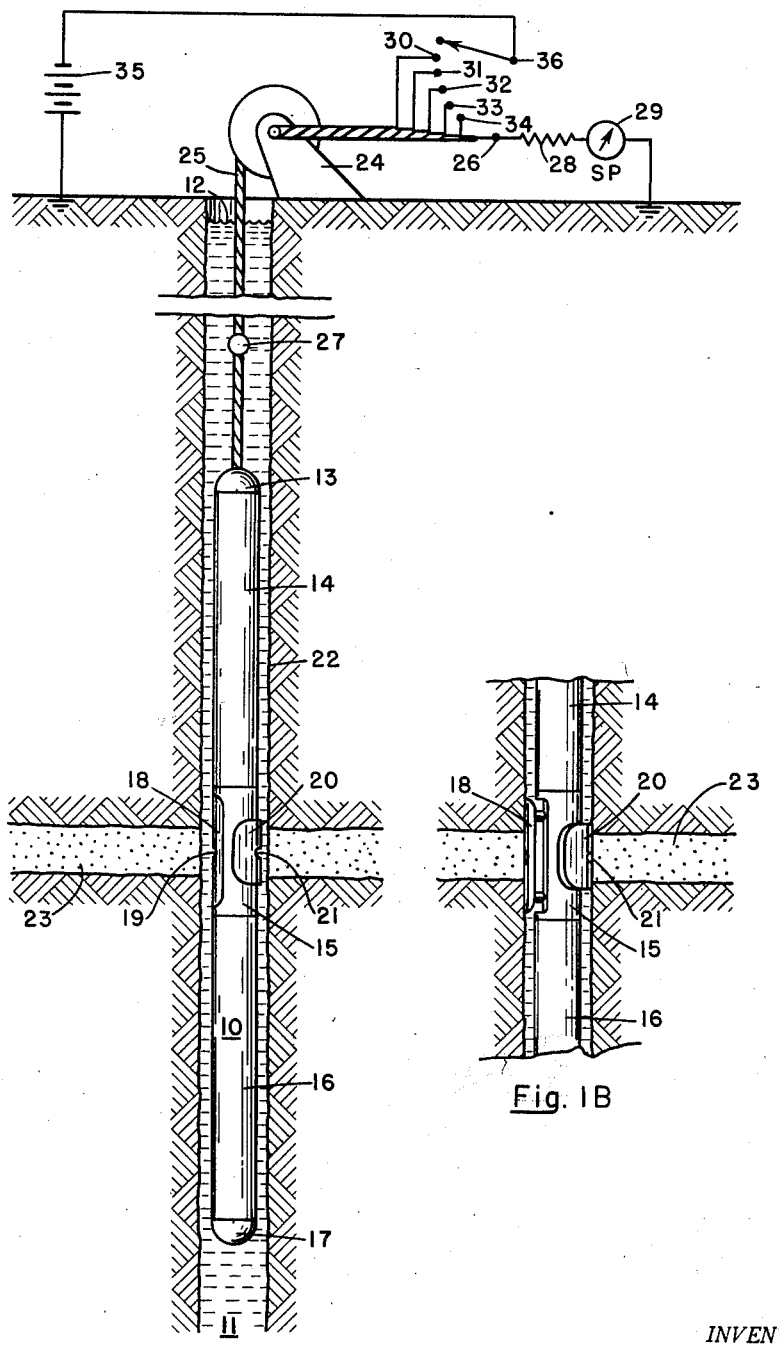
Fig. 1A is a view of the exterior of an exemplary embodiment of the invention as the housing is being passed through a bore hole.
Fig. 1B is a partial view of the housing shown in Fig. 1A during the sample taking operation.

In the exemplary embodiment shown in Fig. 1A, a pressure resistant housing 10 is adapted to be passed through a bore hole 11 containing a column of drilling fluid 12. Housing 10 may for convenience in handling be divisible into a plurality of separate sections coupled together in any conventional manner, as for example by the usual threaded joints. Thus in Fig. 1, housing 10 is divided into five separable sections: cable head 13, a sample containing section 14, sampling section 15, differential pressure chamber 16, and base plate 17. On the exterior of sampling section 15 are retracted back-up shoe 18 and retracted sampling shoe 20, the latter having a fluid intake port 21 on the face thereof, the former an opening 19 for access to the interior of section 15. When housing 10 has been lowered to the proper level the shoes 18 and 20 are thrust against the wall 22 of bore hole 11 in such a manner (Fig. 1B) that intake port 21 of sampling shoe 20 is isolated from bore hole fluid 12 but exposed to formation 23, of which a fluid sample is desired. When sufficient formation fluid has entered port 21 into a sample retaining chamber in section 14, shoes 18 and 20 are retracted back into the position shown in Fig. 1.

The raising and lowering of housing 10 through bore hole 11 may be controlled from the surface by means of a winch 24 which spools a cable 25 connected to head 13 of housing 10. The cable 25 may be a conventional electric cable and may contain a plurality of insulated conductors 26, 30, 31, 32, 33 and 34. Conductor 26 may be connected at one terminal to an electrode 27, a fixed distance from housing 10, the other terminal connected to a high resistance voltmeter circuit which may comprise resistor 28 and recording galvanometer 29 in series. If the drilling fluid 12 is conductive, as is usually the case, recording galvanometer 29 will give a continuous indication of the variations in the spontaneous potentials along the bore hole whereby housing 10 may be accurately placed by comparing the readings from meter 29 with a previously run electrical log, as is well known in the art.

The remainder of the conductors 30, 31, 32, 33 and 34 are adapted to be connected at the surface through conventional slip-rings mounted on winch 24, to current source 35 by means of switch 36. These conductors are connected to the various devices to be explained hereinafter which actuate the fluid tester. It is understood of course that switch 36 could be placed in housing 10, and remotely operated as is well known in the art as shown for example in Fig. 11 of Patent No. 2,048,451, issued July 21, 1936, thereby reducing the number of conductors required in cable 25. If it is desired to employ a cable containing no conductors, a source of current may be placed in housing 10 and a suitable switch, rotated by a time clock mechanism, employed to connect the current source successively to the various current-activated devices described hereinafter, as shown for example in Patent No. 2,252,270, issued August 12, 1941.

Figure 2:
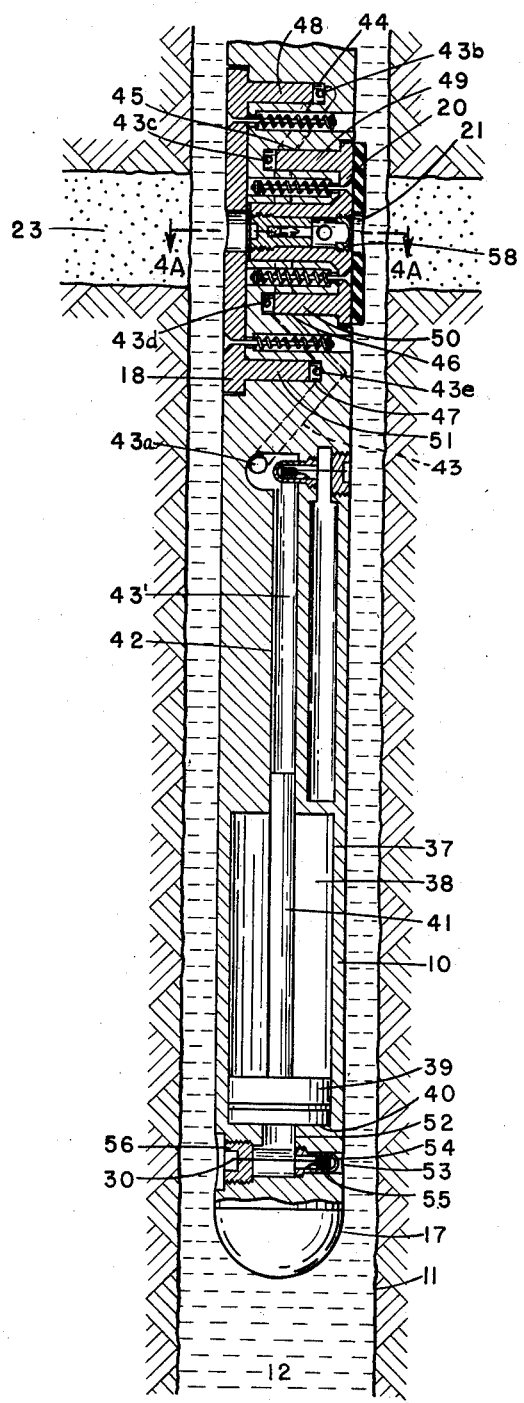
Fig. 2 is a cross-section of the lower portion of the housing of Fig. 1A showing the differential pressure cylinder and the pack-off shoes prior to obtaining a sample of formation fluid.

In Fig. 2 is shown a cross-sectional view of the lower portion of housing 10 with the shoes in retracted position immediately prior to extracting a fluid sample from the formation 23. Within housing 10 is a hollow cylinder 37 preferably filled with air 38 at atmospheric pressure, which is insulated by the walls of housing 10 from the high pressure bore hole fluid 12. A piston 39, adapted to move under pressure through cylinder 37, normally rests at the base 40 of this cylinder. A piston rod 41 is connected at one end to piston 39, the other end being slidably mounted in chamber 42, which is preferably filled with a substantially incompressible liquid, such as oil 43'. The movement of rod 41 by means of piston 39 through chamber 42 therefore tends to increase the pressure of oil 43' therein.

From a port 43a in the upper end oil chamber 42 an oil filled channel 43, passing through housing 10, provides a liquid path to channels 43b, 43c, 43d, and 43e in the rear of a plurality of cylinders 44, 45, 46 and 47, respectively, in which are placed pistons 48, 49, 50 and 51 respectively. Pistons 48 and 51 are connected to back-up shoe 18, pistons 49 and 50 being connected to sampling shoe 20. An increase in the pressure of oil 43' in chamber 42 will in turn increase the pressure behind pistons 48, 51 and 49, 50 and thus force shoes 18 and 20, respectively, away from housing 10.

From the base 40 of low pressure cylinder 37, a channel 52 communicates with a port 53 in the exterior of housing 10, but is normally blocked by a frangible plug 54, whereby the bore hole fluid cannot enter cylinder 37. In close proximity to frangible plug 54 is placed a small explosive charge 55, containing an electrical igniter (not shown) one side of which is grounded to housing 10. An insulated conductor 30 electrically connects the other side of the igniter through fluid resistant plug 56 to switch 36 at the surface. When housing 10 has been lowered into bore 11 to the point where sampling shoe 20 is opposite the desired formation 23, source of current 35 may be connected through conductor 30 to charge 55, thereby rupturing frangible plug 54.

Figure 3:
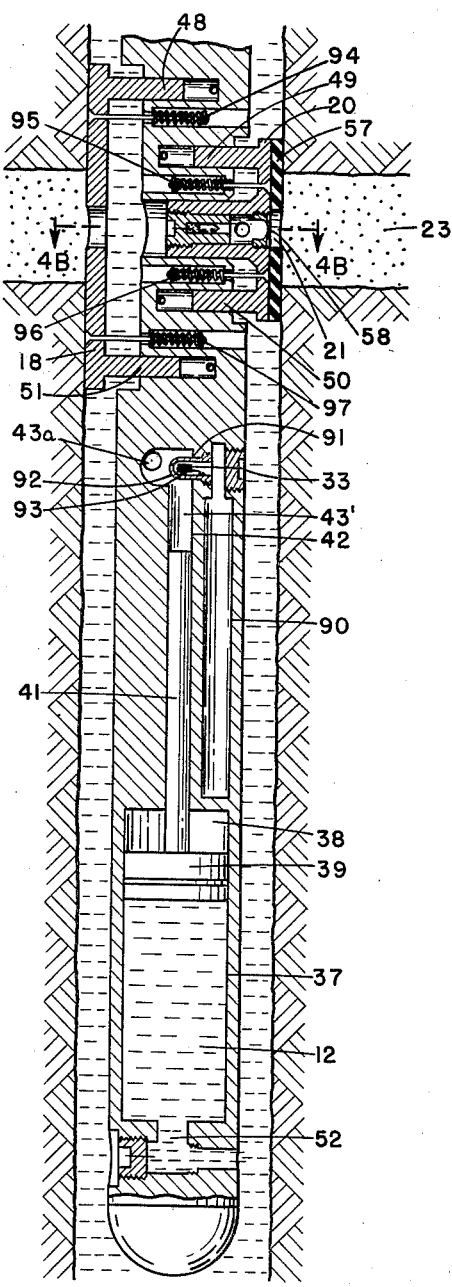
Fig. 3 is another cross-sectional view of the apparatus shown in Fig. 2 after the pack-off shoes have been forced against the formation.

In Fig. 3 is shown the apparatus described in connection with Fig. 2 shortly after the rupturing of plug 54. Since air 38 in cylinder 37 is at a substantially lower pressure than the drilling fluid 12, fluid 12 will pass through channel 52 into cylinder 37 below piston 39, driving it up into cylinder 37. Piston rod 41 will in turn force the oil 43' in chamber 42 through channel 43 at a great pressure, thereby forcing pistons 48, 49, 50 and 51 to thrust shoes 18 and 20 against the walls of bore hole 11. These shoes 18 and 20 will remain pressed against the wall of the bore hole, for by proper design a pressure differential will exist between air 38 and bore hole fluid 12 at the time contact is made by the shoes against the wall. Fluid entry port 21 of sampling shoe 20 will thereby also be pressed firmly against formation 23 and will be isolated from the drilling fluid 12. Sampling shoe 20 is preferably faced with rubber 57 to insure proper isolating action.

Figure 4A:
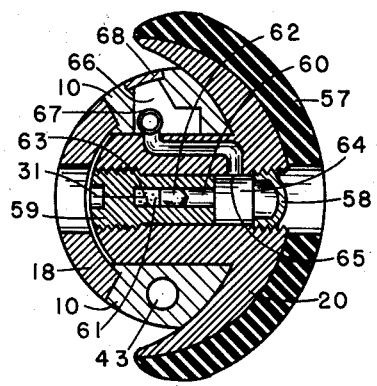
Fig. 4A is a cross-section of the sampling apparatus in Fig. 2 taken through the line 4A—4A.

Fluid entry port 21 in the face of shoe 20 is normally sealed with a frangible plug 58 which is capable of resisting the hydrostatic pressure in the bore hole. In Fig. 4A is shown in detail a cross-section of the sampling section through the lines 4A—4A in Fig. 2, prior to forcing the shoes 18 and 20 against the formation. To the rear of plug 58, within sampling shoe 20, is inserted a removable gun unit 59, comprising a bore 60 containing an explosive charge 61 and projectile 62 directed at plug 58. An electrical igniter 63, which is grounded to gun unit 59 on one side, is connected on the other side to insulated conductor 31 and placed within charge 61. Between gun unit 59 and plug 58 is an empty chamber 64, from which an open channel 65 extends through the rear of shoe 20 to a slot 66 in the side of housing 10. Channel 65 is connected at slot 66 to a flexible tube 67. Slot 66 and tube 67 extend laterally up the side of housing 10 to the sample retaining chamber (Fig. 5) and are protected from excessive wear by removable plate 68.

Figure 4B:
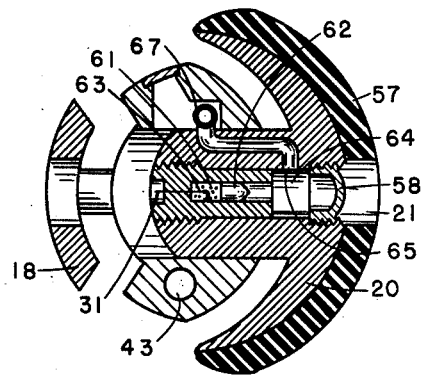
Fig. 4B is a cross-section of the sampling apparatus in Fig. 3 taken through the line 4B—4B.
Figure 5:
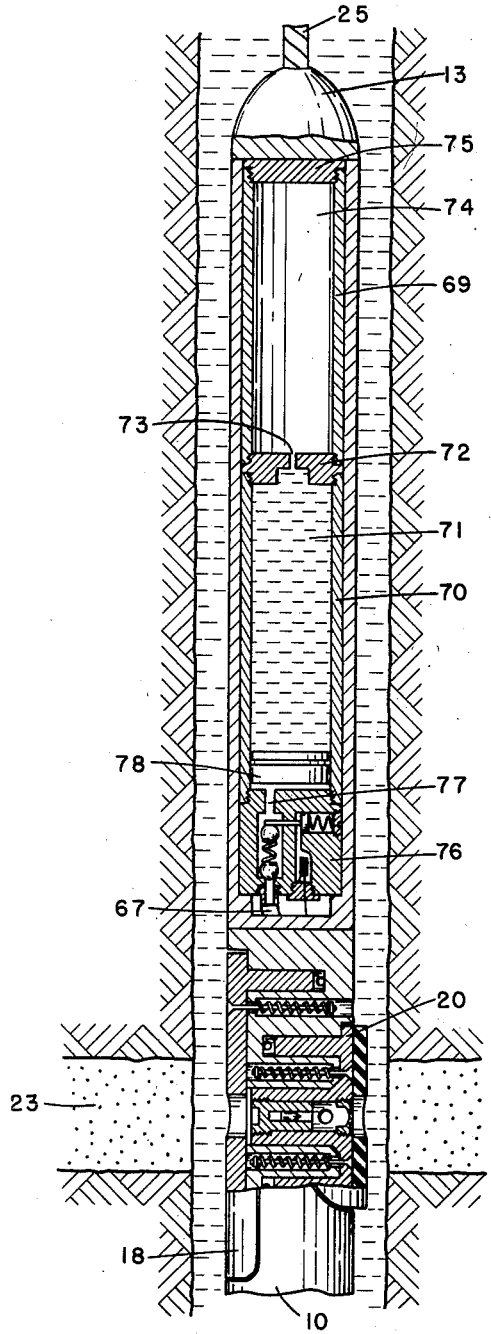
Fig. 5 is a view of the fluid sample container and pack-off shoes prior to obtaining a sample.

In Fig. 5 is shown the fluid sample retaining chamber which is separated into two hollow sections: low pressure chamber 69 and cylinder 70, the latter being filled with a substantially incompressible liquid such as water 71. Chamber 69 and cylinder 70 are joined by connecting plate 72 in which is small orifice 73. Chamber 69 is preferably filled with air 74 at atmospheric pressure and has a removable cap 75 at its head. At the base of cylinder 70 is attached ball valve device 76 (shown in greater detail in Fig. 7) through which passes a vent 77 connected to the flexible tube 67 extending to the fluid entry channel 65 (Fig. 4A). At the surface of the earth, when tube 67 is disconnected from vent 77 the entire sample retaining device 76 may be removed from housing 10. A piston head 78 normally rests against the base of cylinder 70, blocking vent 77, but is slidably movable up into cylinder 70 by an increase in pressure theerbeneath. However, the upward motion of piston 78 will force liquid 71 in cylinder 70 to move into chamber 69 through orifice 73. As the orifice 73 is made very small, piston 78 may only be displaced very slowly. As shown in Fig. 4B, when the back-up shoe 18 and sampling shoe 20 are extended so as to press against the formation, flexible tube 67 will slide forward in slot 66 so as to maintain communication between cylinder 70 and entry port 21 in the face of shoe 20.

After the housing 10 has been placed opposite the formation 23 to be tested, and the shoes 18 and 20 have been expanded thereagainst, the testing apparatus is now ready to begin the fluid sample extracting operation. After the operator at the surface has connected conductor 30 to source of current 35 and sufficient time has elapsed to allow for the shoes 18 and 20 to be properly set, conductor 31 is connected by means of switch 36 to source 35. A current will thereby pass through igniter 63 detonating explosive charge 61 (Fig. 4B), and projectile 62 will rupture frangible plug 58 and become embedded in the surrounding formation. Even though an open channel 65—67—77 extends from opening 64 in the path of projectile 62 to cylinder 70, no appreciable amount of explosive gases will enter said cylinder in the brief interval following the explosion since piston 78 will not be displaced to any great extent.

Figure 6:
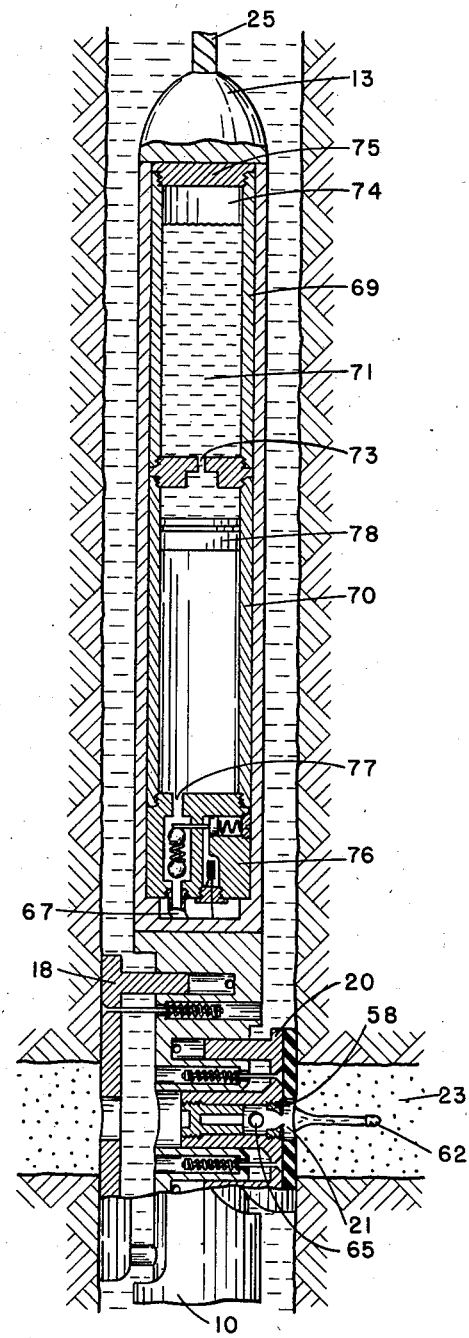
Fig. 6 is a view of the apparatus shown in Fig. 5 during the flow of a sample in the fluid sample container.

In Fig. 6 is shown the sample retaining apparatus after projectile 62 has ruptured plug 58 and become imbedded in formation 23. If gas or oil is contained in formation 23 in producible form, it will be under great pressure and will, accordingly, pass through port 21, channel 65, tube 67 and vent 77 in ball valve device 76 into cylinder 70 beneath piston 78. Due to the pressure of the formation fluid entering cylinder 70, piston 78 will be forced upward displacing water 71 through orifice 73 into chamber 69. The fluid will enter cylinder 70 at a substantially constant rate due to the flow through orifice 73, and thus a uniform, representative sample of the fluid in formation 23 will be admitted to cylinder 70. The fluid sample will continue to enter cylinder 70 until there is pressure equilibrium in cylinder 70 and chamber 69.

Figure 7:
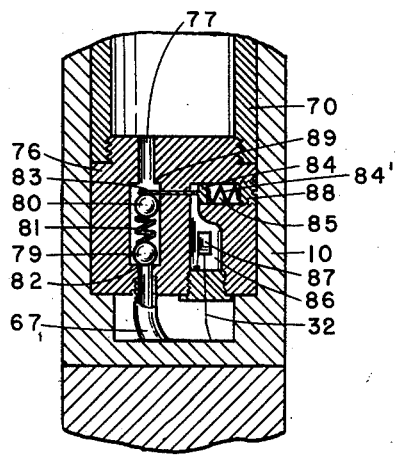
Fig. 7 is a detail of the valve apparatus shown in Figs. 5 and 6.

The fluid sample passing into cylinder 70 may only flow in one direction due to the action of ball valve device 76, shown in greater detail in Fig. 7. Within vent 77 are two balls 79 and 80 which are separated by spring 81. Ball 79 normally blocks opening 82 while ball 80 rests against rod 83 so that fluid may pass therearound. Thus when fluid from the formation being tested passes through tube 67, spring 81 will contract due to the pressure being applied to ball 79. The formation fluid may then enter freely through vent 77 into chamber 70. On the other hand, if the pressure in tube 67 is reduced the fluid that previously entered cylinder 70 cannot escape since ball 79 will effectively block opening 82.

Rod 83 passes through housing 76 and is attached to a piston 84 riding in hollow chamber 85. Piston 84 forces rod 83 to normally remain in vent 77 by means of a spring 84' therebehind. Ahead of piston 84 in opening 86 is a small explosive charge 87 which is grounded on one side to housing 76. The other side of charge 87 is connected by means of insulated conductor 32 to switch 36 at the surface.

After the formation fluid has been permitted to enter chamber 70 for a sufficient interval of time, the operator connects the source of current 35 to conductor 32 and charge 87 is detonated. This in turn will force piston 84 through chamber 85 against plug 88, and rod 83 will be thereby withdrawn from vent 77. Spring 81 will force ball 80 against opening 89, and thus vent 77 will be blocked from fluid flow in either direction. The sample of formation fluid in cylinder 70 is now ready to be brought to the surface.

However, before housing 10 may be raised, shoes 18 and 20 must be retracted. In Fig. 3 a hollow cylinder 90 is shown for this purpose. Cylinder 90, which may be larger than shown by extending it circumferentially about chamber 42, is preferably filled with air at atmospheric pressure. An opening 91 between cylinder 90 and chamber 42 is normally blocked by a frangible plug 92. An explosive charge 93 opposite plug 92 is connected to insulated conductor 33 in the manner of charges 55 and 87. After obtaining the fluid sample, source of current 35 is connected to conductor 33 and explosive charge 93 will thereby rupture plug 92. The oil 43', under pressure in chamber 42 and channel 43, may now flow into cylinder 90. Springs 94, 95, 96 and 97 will now retract shoes 18 and 20 into their initial position, due to the decrease in oil pressure on pistons 48, 49, 50 and 51. Springs 94, 95, 96 and 97 serve also to retain shoes 18 and 20 against the housing 10 while passing through the bore hole.

Figure 8:
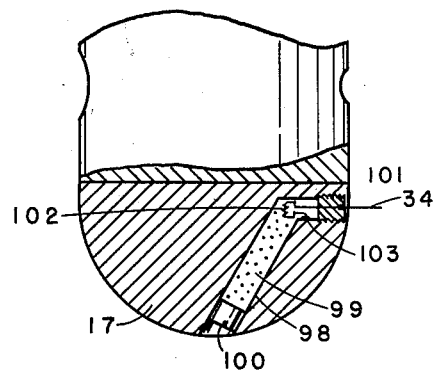
Fig. 8 is a cross-section of a base plate which may be employed.

The housing 10 is now ready to be withdrawn from bore hole 11. However since this sampling operation requires that the bore hole apparatus remain stationary for a few minutes, there is a possibility that housing 10 may have become stuck in the bore hole. In order that the housing 10 may be readily released, a special base plate 17 is provided as shown in detail in Fig. 8.

Base plate 17 contains a downwardly directed channel 98 which is filled with an explosive charge 99. At the lower end of channel 98 is placed a blunt projectile 100 of soft, drillable metal such as brass. Through a fluid-resistant plug 101 in the other extremity of channel 98 is passed insulated conductor 34 which is connected to an igniter 102 in charge 99 and thence to ground at 103. Now if upon attempting to withdraw the housing 10, it is found to be stuck, conductor 34 at the surface is connected to source of current 35 whereby igniter 102 becomes heated and detonates charge 99. The jolt from this explosion will normally force the housing 10 free.

When housing 10 is brought to the surface, cable head 13 may be removed and the entire fluid sample housing comprising chamber 69, cylinder 70 and blocked valve device 76 may be withdrawn from housing 10. The pressure of air 74 may then be measured as an indication of the pressure in formation 23, and the fluid sample in cylinder 70 analyzed for its oil and gas content.

Though not shown in the drawings, conductors 30, 31, 32, 33 and 34 are preferably inserted in a protected slot extending around the exterior of housing 10 whereby they may be readily connected to their respective explosive charges. Also, if desired, a cylindrical filter may be placed in opening 64 (Fig. 4A) in order to keep formation sands from entering cylinder 70.

It will be understood that the illustrative embodiment disclosed herein is susceptible of numerous modifications in form and detail within the scope of the invention. The embodiment described and shown in the drawings, therefore, is not to be regarded as limiting the scope of the following claims.

I claim:

1. A device for obtaining samples of the fluid content of formations traversed by a bore hole containing a column of liquid, a support adapted to be lowered in a bore hole, a first chamber in said support for retaining a fluid sample, pack-off means mounted on said support and having one surface facing the walls of said bore hole, a normally blocked fluid channel for providing communication between said first chamber and said surface, fluid driven motive means adapted to force the surface of said pack-off means against the wall of said bore hole, a second chamber coupled to said motive means and filled with a substantially incompressible liquid for activating said motive means, a low pressure cylinder in said support, a piston mounted in said low pressure cylinder, a rod connected to said piston and extending slidably into said second chamber, means for selectively admitting the liquid in said bore hole into said low pressure cylinder behind said piston whereby said rod creates a pressure in said second chamber forcing the surface of said pack-off means against the wall of said bore hole, means for unblocking said fluid channel, means for reblocking said fluid channel, and means for retracting said pack-off means.

2. A device for obtaining samples of the fluid content of formations traversed by a bore hole containing a column of liquid comprising a support adapted to be lowered in a bore hole, a first chamber in said support for retaining a fluid sample, pack-off means reciprocably mounted on said support and having one surface facing the wall of said bore hole, elastic means normally retaining said pack-off means against said support, a normally blocked fluid channel for providing communication between said first chamber and said pack-off surface, fluid driven motive means adapted to force the surface of said pack-off means against the wall of said bore hole, a second chamber filled with a substantially incompressible fluid for activating said motive means, a low pressure cylinder having a piston mounted therein, a rod connected to said piston and extending slidably into said second chamber, means for admitting the bore hole liquid into said low pressure chamber behind said piston whereby said rod creates a pressure in said second chamber forcing the surface of said pack-off means against the wall of the bore hole, means for unblocking said fluid channel whereby fluid from the formation opposite said pack-off surface may enter said first chamber, means for closing off said channel, and means for reducing the pressure in said second chamber whereby said elastic means retracts said pack-off means against said support.

3. A device for retaining samples of the fluid content of earth formations at substantially the formation pressure comprising a support adapted to be lowered in a bore hole containing, in combination, a first chamber filled with a compressible fluid at a pressure substantially lower than said formation pressure, a second chamber below said first chamber and substantially filled with a substantially incompressible liquid, an orifice providing communication between said first and said second chambers, a normally closed fluid entry port in said second chamber, and means for displacing the liquid through said orifice in accordance with fluid admitted through said entry port.

4. A device for retaining samples of the fluid content of earth formations at substantially the formation pressure comprising a support adapted to be lowered in a bore hole containing, in combination, a chamber filled with gases at substantially atmospheric pressure, a hollow cylinder below said first chamber and substantially filled with a substantially incompressible liquid, an orifice providing communication between said chamber and said cylinder, a piston normally resting against the base of said cylinder, and means for admitting fluid into said cylinder beneath said piston whereby the admitted fluid displaces the liquid in said cylinder.

5. A device for obtaining samples of the fluid content of formations traversed by a bore hole comprising a support adapted to be lowered in a bore hole, a chamber in said support substantially filled with an incompressible liquid, pack-off means mounted on said support, a normally closed channel for providing communication between said chamber and a port in the face of said pack-off means, means for forcing said pack-off means against a selected formation, means for opening said normally closed channel, liquid receiving means, and means for displacing the liquid in said chamber into said liquid receiving means, by the fluid entering through said channel.

6. A device for obtaining samples of the fluid content of formations traversed by a bore hole comprising a support adapted to be lowered in a bore hole, a chamber in said support filled with gases at substantially atmospheric pressure, a hollow cylinder mounted in said support below said chamber and substantially filled with a substantially incompressible liquid, an orifice providing communication between said chamber and said cylinder, a piston normally resting against the lower base of said cylinder, pack-off means mounted on said support, a normally closed channel connecting a part in the face of said pack-off means and the inner base of said cylinder, means for forcing said pack-off means against a selected formation, and means for opening said normally closed channel whereby the fluid from the formation entering said channel displaces the liquid in said cylinder into said chamber.

7. A device as in claim 6 including means for reclosing said channel, and means for retracting said pack-off means.

8. Apparatus for obtaining samples of the fluid content of formations traversed by a bore hole containing a column of mud, which comprises: a support adapted to be lowered in a bore hole; a first chamber in said support filled with gas at substantially atmospheric pressure; a first hollow cylinder below said chamber substantially filled with a substantially incompressible liquid and having a first piston normally resting against its lower base; an orifice providing communication between said chamber and said cylinder; pack-off means reciprocably mounted on said support having one surface facing the wall of said bore hole; elastic means normally retaining said pack-off means against said support; a normally closed channel for providing communication between the lower base of said cylinder and a port in said surface of the pack-off means; fluid driven motive means adapted to force said pack-off means against the wall of the bore hole; a second chamber filled with a substantially incompressible liquid for activating said motive means; a second hollow cylinder filled with gas at substantially atmospheric pressure and having a second piston mounted therein; a rod connected to said second piston and extending slidably into said second chamber; means for admitting the mud in said bore hole into said second cylinder whereby said rod creates a pressure in said second chamber forcing said pack-off means against the wall of the bore hole; means for opening said normally closed channel whereby fluid from the packed-off formations displaces the liquid in said first cylinder; means for closing off said channel; and means for reducing the pressure in said second chamber whereby said elastic means retracts said pack-off means against the support.

9. Apparatus as in claim 8, wherein said means for admitting mud, said means for opening said normally closed channel, said means for closing off said channel, and said means for reducing pressure in said second chamber are each explosively activated.

10. Apparatus as in claim 8 wherein said means for reducing the pressure in said second chamber comprises a third chamber containing air at substantially atmospheric pressure, a normally closed port between said second and said third chambers, and means for opening said normally closed port.

11. Apparatus as in claim 8, and means for explosively shaking said support loose if stuck in the bore hole.

12. A device for obtaining samples of the fluid content of formations traversed by a bore hole containing a column of liquid comprising a support adapted to pass through a bore hole, a sample receiving chamber mounted in said support, pack-off means having a face adapted to fit the contour of the wall of said bore hole normally retained against said support, a port in said face, a channel connecting said port and said chamber, back-up means normally retained against said support in a position opposite said pack-off means, driving means adapted to force the face of said pack-off means and said back-up means against the wall of said bore hole, a low pressure chamber mounted in said support, and means for applying the difference in pressure between said low pressure chamber and said column of liquid to said driving means when said pack-off means is opposite a selected formation.

13. A device for obtaining samples of the fluid content of formations traversed by a bore hole containing a column of liquid comprising a support adapted to pass through the bore hole, a first sealed chamber mounted in said support for receiving said fluid samples, pack-off means having a face adapted to fit the contour of the wall of said bore hole normally retained against said support, a port in said face, a normally closed channel fluidly connecting said port and said first chamber, driving means in said support adapted to force the face of said pack-off means against the wall of said bore hole, a second sealed, low pressure chamber mounted in said support, means for applying the difference in pressure between said column of liquid and said second chamber to said driving means when the pack-off means is opposite a selected formation, and means for opening said normally closed channel.

14. A device as in claim 13 including elastic means tending to retract said pack-off means, and means for reducing the pressure applied to said motive means whereby said elastic means retracts said pack-off means.

References Cited in the file of this patent
UNITED STATES PATENTS

| Number | Name | Date |
|---|---|---|
| 2,418,500 | Chalmers | Apr. 8, 1947 |
| 2,458,631 | Parks | Jan. 11, 1949 |
| 2,509,608 | Penfield | May 30, 1950 |
| 2,545,306 | Pollard | Mar. 13, 1951 |
| 2,563,284 | Seay | Aug. 7, 1951 |